United States Patent [19]

Minagawa et al.

[11] Patent Number: 4,910,628
[45] Date of Patent: Mar. 20, 1990

[54] TERMINAL UNIT IN INFORMATION TRANSMISSION SYSTEM

[75] Inventors: Yoshiji Minagawa; Yoshiyuki Honda; Yoshiaki Ito; Toshiyasu Higuma; Mitsunobu Esaki, all of Kanagawa, Japan

[73] Assignee: Mitsubishi Denki Kabushiki Kaisha, Tokyo, Japan

[21] Appl. No.: 243,848

[22] Filed: Sep. 13, 1988

[30] Foreign Application Priority Data

Nov. 13, 1987 [JP] Japan ................................ 62-286943
Nov. 30, 1987 [JP] Japan ................................ 62-302964
Feb. 17, 1988 [JP] Japan ................................ 63-32863

[51] Int. Cl.$^4$ .............................................. H02H 3/18
[52] U.S. Cl. ........................................ 361/84; 361/77; 340/310 R; 307/127
[58] Field of Search .................... 361/84, 77; 307/127, 307/130; 320/25, 26; 340/310 R

[56] References Cited

U.S. PATENT DOCUMENTS

| | | | |
|---|---|---|---|
| 3,973,202 | 8/1976 | Gardner | 320/26 X |
| 4,027,223 | 5/1977 | Renz | 320/26 |
| 4,180,746 | 12/1979 | Giuffra | 307/127 |
| 4,374,306 | 2/1983 | Lohr | 302/127 X |

FOREIGN PATENT DOCUMENTS 61-245723 11/1986 Japan .

OTHER PUBLICATIONS

Investigation and Research Commission on Household Intelligent System, "Reports from Investigation and Research Commission on Household Intelligent System (Final Reports)-Section: Technical Standardization", Mar. 1986, pp. 87-89.
Report on Study of Standard Specification for Hone Bus System, Feb. 1987.

Primary Examiner—Todd E. Deboer
Attorney, Agent, or Firm—Bernard, Rothwell & Brown

[57] ABSTRACT

A terminal unit for use in an information transmission system disposed between an information transmission line in the information transmission system constituted of signal lines for transmitting a signal by conduction therethrough of a direct current having positive polarity and negative polarity and controlled equipment as one terminal of the system, including at least a coupling circuit for transmitting and receiving a signal to and from the transmission line by converting the signal into a direct current as aforesaid and converting such a direct current into the signal, a transmission control device controlling transmission and reception of a signal according to a protocol for signal transmission, and a transmission circuit and a reception circuit disposed between the coupling circuit and transmission control device for making signal transmission and reception, respectively, and further, comprising a polarity detection circuit for detecting polarity of the direct current voltage supplied from the signal lines and a polarity switching circuit for switching polarities of a signal delivered to the transmission line depending upon the result of detection in the polarity detection circuit.

15 Claims, 12 Drawing Sheets

TERMINAL UNIT IN INFORMATION TRANSMISSION SYSTEM

BACKGROUND OF THE INVENTION

1. Field of the Invention

The present invention relates to a terminal unit in an information transmission system including an information transmission line made up of signal lines of positive polarity and negative polarity and, more particularly, to a terminal unit of which plural units are connected to the transmission line and are capable of transmitting and receiving transmission information to the transmission line and from the transmission line in the code of the alternate mark inversion (AMI) mode without being affected by the voltage polarity of the transmission line.

2. Description of the Prior Art

With the recent advancement of electronics, technology in the field of information transmission has also made great progress. The information transmission technology is defined as technology relative to transmission of information that is to be or has been processed by an information processer such as a computer system, and the information transmission system for use in this field of technology in general includes a transmission line connecting the information processors with one another and transmission equipment including input and output terminal units provided between the transmission lines and the information processer. The information transmission technology is not only applied to communications between places of business but recently has come to be used for household communications, such as "home bus system", or communications from outside to home.

FIG. 1A is a block diagram of a first example of a prior art information transmission system as described, for example, in "Reports from Investigation and Research Commission on Household Intelligent System (Final Reports) - Section: Technical Standardization" (published in March 1986, by the Investigation and Research Commission on Household Intelligent System).

FIG. 2 is an explanatory drawing of packet structure and character structure for information transmission and FIG. 3 is an explanatory drawing of the relation between a signal transmitted over a transmission line and a signal delivered from a terminal unit. Referring to FIG. 1A, reference numeral 1 denotes a transmission line consisting of a positive line 1a and a negative line 1b for making power supply and signal transmission, 2 denotes a power supply device consisting of a D.C. power source 2b and an inductance 2a serving as a high impedance to the transmitted signal for supplying power to various units connected to the transmission line 1, and 3 and 13 denote terminal units connected to the transmission line 1. The terminal unit 3 receives power from the transmission line 1 through a power receiving device 4 and makes transmission and reception of signals through a coupling circuit 5. The transmission circuit 8 and reception circuit 11, under the control of a transmission control device 12 exercising control for transmission and reception of signals in accordance with a protocol for the signal transmission, perform transmission to and reception from the transmission line 1 of signals through the coupling circuit 5. The power receiving device 4 is made up of an inductance 4b connected with the positive line 1a of the transmission line 1 for serving as a high impedance to the transmission signal and a stabilizer circuit 4a for voltage stabilization and takes in power from transmission line 1. The coupling circuit 5 consists of capacitors 7a and 7b, whose ends on one side are connected with both terminals of a winding 6a of a transformer 6, including winding 6a, 6b, and 6c, and the ends on the other side are connected with the positive line 1a and negative line 1b of the transmission line 1, respectively. Here, the windings 6b and 6c are connected in series and the middle point thereof is connected with the positive terminal of the power receiving device 4. The transmission circuit 8 includes transistors 9a and 10a, with the collectors of the transistors 9a and 10a connected with one end of the winding 6b and 6c of the transformer 6, respectively, with the emitters connected with ground of the power receiving device 4, and with the bases connected with output terminals 12a and 12b of the transmission control device 12 through resistors 9c and 10c, respectively. Here, bases of the transistors 9a and 10a are connected with the power source positive line of the power receiving device 4 through resistors 9b and 10b, respectively. On the other hand, the reception circuit 11 includes two comparators 11c and 11d, and one input terminal of each of the comparators 11c and 11d is supplied with a reference voltage obtained from divided voltage by resistors 11a and 11b, while the other input terminals are connected with the windings 6b and 6c of the coupling circuit 5, respectively. Output terminals of the comparators 11c and 11d are joined together and connected with the power source positive line of the power receiving device 4 through a resistor 11e and also connected with an input terminal 12c of the transmission control device 12. And, the input terminals of the power receiving device 4 and the capacitors 7a and 7b as input terminals to the coupling circuit 5 are connected with each other and connected with the positive line 1a and negative line 1b of the transmission line 1, respectively. The transmission control device 12, in order to transmit the signal of packet structure and character structure as shown in FIGS. 2(a) and 2(b) in the AMI code, delivers its outputs to the output terminals 12a and 12b, alternately switched therebetween each time the code "0" is transmitted. It may be remarked here that the signal as shown in FIG. 2(a) is structured of priority code PR, self address SA, destination address DA, control code CW, message length BC, data DATA, and check code FCC. Since such a signal is transmitted in an asynchronous manner, the ST bit, or start bit, as shown in FIG. 2(b), is made to be "0" for each terminal unit and the polarity of the transmission line 1 is made to be of the same polarity as that of the supply voltage. The terminal unit 13 is of the same structure as that of the terminal unit 3.

Operation will be described below of the apparatus arranged as above. When the power supply unit 2 is connected to the transmission line 1, the positive line 1a of the transmission line 1 obtains positive polarity and the negative line 1b obtains negative polarity. And, when the terminal unit 3 is connected to the transmission line 1 and a request for transmission is made to the terminal unit 3, the transmission control device 12, after confirming that the transmission line 1 is in an idle state according to a signal from the reception circuit 11, delivers, according to the packet structure as shown in FIG. 2(a), the polarity making the positive line 1a positive. More particularly, it brings its output terminal 12b to the code "1" during the period of start bit ST, whereby a base current flows in the transistor 10a through the resistor 10b, the transistor 10a is turned ON, and the voltage of the power receiving device 4 comes to be applied to the winding 6c so that a voltage with the polarity as indicated by an arrow X shown in FIG. 1A is generated there. Owing to this voltage, a voltage with the polarity in the direction of the arrow X is also generated in the winding 6a, which voltage is delivered through the capacitors 7a and 7b to the transmission line 1 so as to be transmitted over the same superposed on the voltage E supplied from the power supply unit 2 as shown in FIG. 2(b). And, the voltage that is generated in the winding 6b at the time of transmission of the code "0" of the start bit is subjected to level comparison in the comparator 11c, and a voltage as the result of the comparison is applied to the input terminal 12c, whereby the fact that the delivered code is correctly transmitted is verified. When the code "1" is then transmitted, it is achieved by bringing both of the output terminals 12a and 12b to a low level, thereby causing both the transistors 9a and 10a turned OFF. That is, since nothing is output to the transmission line 1, it goes to the voltage level of the power supply unit 2. Further, in the case the code "0" is transmitted next to the transmission of the code "0" of the start bit, the output terminal 12a is brought to a high level, whereby the transistor 9a is turned ON and a voltage with the reverse polarity to that of the start bit is generated so that a voltage with the reverse polarity to that of the supply voltage is applied to the transmission line 1. Thus, serial transmission of an AMI coded baseband signal can be performed. On the other hand, reception of a signal is performed such that the signal transmitted, for example, only by the terminal unit 13 is received by means of the winding 6a through the capacitors 7a and 7b, the level is compared by the comparators 11c, 11d the same as in the case of transmission, and the voltage as the result of the comparison is applied to the input terminal 12c, whereby the transmission control device 12 receives the signal.

Now, the case where the terminal unit 3 and terminal unit 13 started transmission simultaneously will be described. FIG. 3(a) and FIG. 3(b) show signals which the terminal units 3 and 13 desire to transmit, respectively, and FIG. 3(c) shows the signal actually impressed on the transmission line 1.

The code "0" of the start bit transmitted at first is output from each of the terminal units 3 and 13, with the same polarity, and therefore, the output voltage is correctly superposed on the supply voltage in the same polarity so as to be transmitted as the code "0". For the code "1" of the next bit, both the terminal units 3 and 13 also operate equally so as not to superpose any signal on the transmission line 1. And for the code "0" of the next bit, both the terminal units 3 and 13 output a signal of the reverse polarity to that of the start bit, and therefore, the transmitted signal and received signal agree with each other and the transmission is carried out correctly.

In the next bit, the terminal unit 3 tries to transmit the code "0" while the terminal unit 13 tries to transmit the code "1", and as a result, the transmission line 1 comes into a state transmitting the code "0", whereupon since the transmitted signal and received signal are not in agreement for the terminal unit 13, it stops its transmission, while only the terminal unit 3 continues its transmission. Thus, signal transmission using the carrier sense multiple access/collision detection (CSMA/CD) system as the transmission control system can be attained.

In order that the CSMA/CD transmission control is performed for certain, the terminal units 3 and 13 must deliver the code "0" of the start bit in the same polarity to the transmission line 1.

A second example of a prior art information transmission apparatus will be described below.

FIG. 1B is a circuit diagram showing an example of a prior art information transmission apparatus as described, for example, in "Reports from Investigation and Research Commission on Household Intelligent System (Final Reports) - Section: Technical Standardization" (published in March, 1986, by the Investigation and Research Commission on Household Intelligent System.) Referring to the figure, reference numeral 1 denotes an information transmission line (hereinafter to be called the transmission line), and the transmission line 1 consists of a signal line 1a to which the transmitted signal has positive polarity relation and a signal line 1b to which it has negative polarity relation. Reference numerals 3 and 13 denote terminal units connected with each other through the transmission line 1 and transmitting information in an AMI coded baseband signal. The terminal units 3, 13 each include a coupling circuit 5 coupling itself with the transmission line 1, transmission circuit 8, reception circuit 11, and a transmission control device 12.

Construction of each section will be described below in detail. The coupling circuit 5 consists of terminals 51, 52 serving as input terminals, capacitors 7a, 7b connected in series with the terminals 51, 52, respectively, and a coupling transformer having windings 6a, 6b, and 6c.

The transmission circuit 8 consists of transistors 9a, 10a, of which collectors are connected with the windings 6b, 6c of the coupling transformer and emitters are grounded, and base resistors 9c, 10c. The other ends of the resistors 9c, 10c are connected with the transmission control device 12. The AMI code is transmitted by turning the transistors 9a, 10a ON and OFF each time the code "0" is transmitted.

The reception circuit 11 consists of comparators 11c, 11d one input terminal of which is connected with the windings 6b, 6c of the coupling transformer 6 and the other input terminal is connected with a reference voltage generating terminal constituted of a series circuit of resistors 11a, 11b, and an OR circuit 11f having the outputs of the comparators 11c, 11d connected to its input terminals. The output terminal of the OR circuit 11f is connected with input terminal 12c of the transmission control device 12.

Of an AMI code transmitted over the transmission line 1, a signal transmitted with the positive polarity is induced in the winding 6b and subjected to level comparison in the comparator 11c and thereby converted into an NRZ signal. And a transmitted signal of the negative polarity is received by the winding 6c and subjected to level comparison in the comparator 11d and thereby converted into an NRZ signal. Therefore, the reception circuit 11 is a circuit to convert an AMI code into an NRZ code.

The transmission control device 12 is constituted of a microcomputer and the like and includes a start bit transmission terminal 12b for transmitting a signal in positive polarity relation to the signal line 1a, and a transmission terminal 12a for transmitting a signal in negative polarity relation thereto, both the terminals delivering their outputs alternately each time the code "0" is transmitted in order to transmit an AMI code through the transmission circuit 8 to the transmission line 1, and it also includes a reception terminal 12c connected with the output of the reception circuit 11 for receiving a signal transmitted over the transmission line 1.

The information transmission apparatus of the above described organization, while assembling and disassembling the transmission packet as shown in FIG. 2, detects collision by comparing the transmitted data from the transmission terminals 12a, 12b with the data transmitted over the transmission line 1 as shown in FIG. 3, and when it loses in the competition of the collision, it stops its transmission.

Operation will be described below. Upon receipt of a request for transmission, the transmission control device 12 confirms that the transmission line 1 is in an idle state from a signal from the reception terminal 12c, and then, performs data transmission in the AMI code according to the packet structure as shown in FIG. 2(a) from the start bit (ST) for character synchronization. Referring to FIG. 2, PR denotes priority code, SA denotes self address, DA denotes destination address, CW denotes control code, BC denotes message length, DATA denotes data, and FCC denotes check code.

A number of terminal units 3, 13, connected to the transmission line 1, each transmit the code "0" as the start bit to the transmission line 1 to provide the signal line 1a of the transmission line 1 with positive polarity in order that the terminal units 3, 13 detect collision of data in the transmission line 1 from the difference between the data transmitted by the terminal unit 3 (FIG. 3(a)), and that transmitted by the terminal unit 13 (FIG. 3(b)), and the data transmitted, as the result, over the transmission line 1 (FIG. 3 (c)).

That is, the transmission control device 12 keeps its transmission terminal 12b at a high level during a one bit period corresponding to the start bit, whereby the transistor 10a is turned ON and the source voltage is applied to the winding 6c. A voltage corresponding to the source voltage is induced in the winding 6a and applied through the capacitors 7a, 7b to the transmission line 1 with the polarity as shown in the figure, that is, with positive polarity to the signal line 1a.

In transmitting the code "0" in the next place, the transmission terminal 12a is brought to a high level, whereby the transistor 9a is turned ON, reverse voltages to the above are generated in the windings of the coupling transformer 6, and as a result, a signal is transmitted to the transmission line 1 with the polarity in positive relation to the signal line 1b.

And, in transmitting the code "1", both the transmission terminals 12a and 12b are brought to a low level.

In the above cases, the codes "0" and "1" transmitted by turning the transistors 9a and 10a ON/OFF are subjected to level comparison in the comparators 11c, 11d at all times, converted into NRZ signals by the OR circuit 11f, and the transmitted data and the received data of the transmitted data over the transmission line 1 obtained through the reception circuit 11 are compared and detection of collision is performed as shown in FIG. 3.

That is, when the terminal units 3 and 13 try to transmit their signals at the same time, first the codes "0" as the start bit are simultaneously delivered with the same polarity, and therefore, the code "0" is transmitted over the transmission line 1 as shown in FIG. 3(c).

The next code is equally "1" for both the terminal units 3 and 13 and it is transmitted as the code "1" over the transmission line 1. Then, when the terminal unit 3 delivers the code "0" and the terminal unit 13 delivers the code "1", the code "0" is transmitted over the transmission line 1. Therefore, the terminal unit 13 detects a collision from the difference between the delivered data and the received data from the transmission line 1, and hence, it thereafter performs only signal reception.

Now, a third example of the prior art will be described with reference to FIG. 1C.

FIG. 1C is a circuit diagram of a prior art information transmission apparatus as described, for example, in "Reports from Investigation and Research Commission on Household Intelligent System (Final Reports) - Section: Technical Standardization" published in March, 1986, by the Investigation and Research Commission on Household Intelligent System. FIG. 2 is a drawing showing packet structure and character structure for information transmission and FIG. 3 is a time chart indicating the relationship between a signal transmitted over a transmission line and signals delivered from terminal units. Referring to the figure, reference numeral 1 denotes a transmission line for signal transmission consisting of a positive signal line 1a of the positive polarity and a negative signal line 1b of the negative polarity. Reference numerals 3, 13 denote terminal units connected to the transmission line 1 and of the following construction. Reference numeral 12 denotes a transmission control device for transmission and reception of information in accordance with a predetermined protocol, and the same is provided with a transmission data positive output terminal 12a and a transmission data negative output terminal 12b for transmitting signals of the packet structure and character structure as shown in FIGS. 2(a), 2(b) in alternate mark inversion code (AMI code) having redundancy in the direction of the amplitude and alternately delivers its outputs at these output terminals 12a, 12b each time the code "0" is output. Reference numerals 9a, 10a denote transistors, with their respective base terminals connected with the transmission data positive output transistor 12a and the transmission data negative output terminal 12b and form a common-emitter amplifier. Reference numeral 6 denotes a coupling transformer, with windings 6b, 6c connected with the collector terminals of the transistors 9a, 10a, and the center tap of the windings 6a, 6b supplied with the source voltage. Therefore, according to turning ON/OFF of the transistors 9a, 10a, collector-emitter current flows and thereby an AMI coded signal (hereinafter to be called the AMI signal) appears across the winding 6a. Reference numerals 7a, 7b denote capacitors for delivering the AMI signal appearing across the winding 6a of the transformer 6 to the transmission line 1 therethrough. Reference numeral 11 denotes a reception circuit made up of an AMI decoder circuit or the like and is connected with the side of the windings 6b, 6c of the transformer 6. The AMI signal over the transmission line 1 is input by way of the capacitors 7a, 7b and the transformer 6 to the reception circuit 11 made up of an AMI decoder circuit or the like, and the result of the decoding is input to the received signal input terminal 12c of the transmission control device 12.

Operation will be described below. When the terminal unit 3 is connected to the transmission line 1 and a request for transmission is made, for example, to the terminal unit 13, the transmission control device 12, after confirming that the transmission line 1 is in an idle state according to a signal from the reception circuit 11 made up of an AMI decoder circuit or the like, delivers, according to the packet structure as shown in FIG. 2(a), the start bit "0" of each character with the polarity making the positive signal line 1a positive. More particularly, it brings its output terminal 12a to a high level during the period of the start bit, whereby a base current is supplied to the transistor 9a, the transistor 9a is turned ON, and a current flows on the side of the windings 6b, 6c of the transformer 6 from the center tap 6d to the collector of the transistor 9a, so that a voltage of the polarity as indicated by the arrow is generated. This voltage causes a voltage to be induced also on the side of the winding 6a of the transformer 6 as indicated by the arrow, whereby a signal of a waveform as shown in FIG. 2(b) is delivered to the transmission line 1 through the capacitors 7a, 7b. And, the voltage generated in the transformer 6 at the time the code "0" of the start bit is transmitted is also input to the reception circuit 11 made up of an AMI decoder circuit or the like and the result of decoding is read into the received signal input terminal 12c, whereby the fact that the delivered code is correctly transmitted is verified. When the code "1" is then transmitted, it is achieved by bringing both of the output terminals 12a and 12b to a low level, thereby causing both the transistors 9a and 10a to be turned OFF. That is, since nothing is output to the transmission line 1, it exhibits zero voltage. Further, in the case the code "0" is transmitted next to the code "0" of the start bit, the output terminal 12b is brought to a high level, whereby the transistor 10a is turned ON and a voltage with the reverse polarity to that for the start bit is generated, so that a corresponding signal is output to the transmission line 1. Thus, serial transmission of an AMI coded baseband signal is carried out. On the other hand, reception of a signal is performed such that the signal transmitted, for example, only by the terminal unit 13 is received by the transformer 6 through the capacitors 7a, 7b, the signal is decoded in the reception circuit 11 made up of an AMI decoder circuit or the like the same as in the case of transmission, and the decoded signal is input to the received signal input terminal 12c, whereby the transmission control device 12 receives the signal.

Now, the case where the terminal unit 3 and 13 started transmission simultaneously will be described. FIG. 3(a) and FIG. 3(b) show signals which the terminal units 3 and 13 attempt to transmit and FIG. 3(c) shows the signal actually impressed on the transmission line 1. The code "0" of the start bit to be transmitted at first is output with the same polarity by each of the terminal units 3 and 13, and therefore, the same is correctly transmitted over the transmission line 1 as the code "0". For the code "1" of the next bit, both the terminal units 3 and 13 also operate equally so as not to deliver any signal to the transmission line 1. And for the code "0" of the next bit, both the terminal units output a signal of the reverse polarity to that of the start bit, and, when both the terminal units deliver the same code, the transmitted signal and received signal agree with each other, and therefore the transmission is carried out correctly. As to the third bit, the terminal unit 3 tries to transmit the code "0" while the terminal unit 13 tries to transmit the code "1". As a result, the transmission line 1 comes to be transmitting the code "0", whereupon since the transmitted signal and received signal are detected to be in disagreement by the terminal unit 13, it stops its transmission, while the terminal unit 3 continues its transmission since the transmitted signal and received signal are in agreement. Thus, a transmission control system such that, when a collision occurs between a terminal unit 3 and another terminal unit 13, one of them remains undefeated, or "CSMA/CD system with one unit remaining undefeated", can be attained. In order that the "CSMA/CD system with one unit remaining undefeated" is performed for certain, the terminal units 3 and 13 must deliver the start bit code "0" in the same polarity relation to the transmission line 1. If there is a unit connected in reverse polarity relation, the signal level of the transmission line 1 becomes unstable when the start level is transmitted, whereby it occurs that neither of the collided terminal units can confirm agreement between the transmitted and received signals and the condition of the "one unit remaining undefeated" becomes unachievable.

Since the prior art information transmission apparatus have been organized as described above as to their examples, there have been various problems with them as will be mentioned below.

First, in the case of the first example of the apparatus, when signal transmission in the AMI code is made between terminal units connected to the transmission line, if there is a unit connected with the transmission line in the reverse polarity relation thereto, the signal level of the transmission line becomes unstable when the start level is transmitted and the transmission becomes impossible. Thus, there were such problems that the workability was lowered for such reason and trouble causing incapability of transmission was liable to be made by errors in the connection work.

Next, in the case of the second example, to make sure that the collision between signals is correctly detected, the correctness of the polarity of the signal to be impressed on the transmission line becomes essential. Therefore, there were such problems that the polarity of each of the terminal units, when connected to a transmission line, had to be carefully determined; nevertheless, errors in the connection work were liable to be produced.

Finally, in the case of the third example, it is required to confirm the polarity of the terminal units 3, 13 in connecting them to the transmission line 1 in order that disagreement between the transmitted signal to and the received signal from the transmission line 1 is not caused. However, there was such a problem that the terminal units 3, 13 were wrongly connected with the transmission line in their installation work and thereby trouble was caused in the transmission system.

SUMMARY OF THE INVENTION

It is an object of the present invention to provide an information transmission apparatus which enhances the workability when its terminal unit is connected to the transmission line and is effective in improved reliability thereon by arranging therein such that the polarities of the transmission signal are switched depending upon the polarity of the transmission line and thereby eliminating the necessity for confirming the polarity of the transmission line at the time when the terminal unit is connected to the transmission line.

It is another object of the present invention to provide an information transmission apparatus in which a non-polarized connection of a terminal unit at the time the terminal unit is connected to the transmission line is achieved.

It is a further object of the present invention to provide an information transmission apparatus capable of a normal information transmission without the need for confirming the polarity relation therebetween when the terminal unit is connected to the transmission line.

In order to achieve the above enumerated objects, the terminal unit for use in the information transmission system according to the present invention comprises a polarity detection means connected with the information transmission line constituting the system for detecting the polarity of its D.C. supply voltage and a switching means for switching the polarities of the signal transmitted to the transmission line depending upon the detection result by the detection means.

Accordingly, certain practical examples to be described below in detail are provided with the following principal structures in order to embody the organization of the present invention.

An information transmission apparatus according to the present invention comprises a transmission line for supplying D.C. power to terminal units connected thereto and also for transmitting thereover a signal from a terminal unit, a polarity identification means for identifying the polarity of a D.C. voltage supplied to the transmission line, and a switching means for switching the polarities of a signal to be transmitted to the transmission line depending upon the output of the polarity identification means.

An information transmission apparatus according to the present invention includes a plurality of terminal units connected to an information transmission line, each of the terminal units serially transmitting an encoded baseband signal with a predetermined polarity and in a start-stop synchronization system, and provides each of the terminal units with a polarity detection circuit for detecting the polarity of a start bit which is received at first after the power source is turned on and a switching circuit for switching the polarities of the encoded baseband signal depending upon the output of the polarity detection circuit.

An information transmission apparatus according to the present invention is adapted such that a signal indicating a polarity is output from its polarity setting device to the transmission line for information transmission, an encoded baseband signal is serially transmitted from its terminal unit connected to the transmission line with the polarity in predetermined relation to the polarity that is indicated by the polarity setting device, the polarity of the transmission line is detected by a polarity detection circuit according to the signal output from the polarity setting circuit, and the polarity of the baseband signal is switched by a polarity switching circuit depending upon the output of the polarity detection circuit.

DETAILED DESCRIPTION OF THE PREFERRED EMBODIMENTS

Embodiments of the present invention will be described below with reference to the accompanying drawings.

Figure 4:
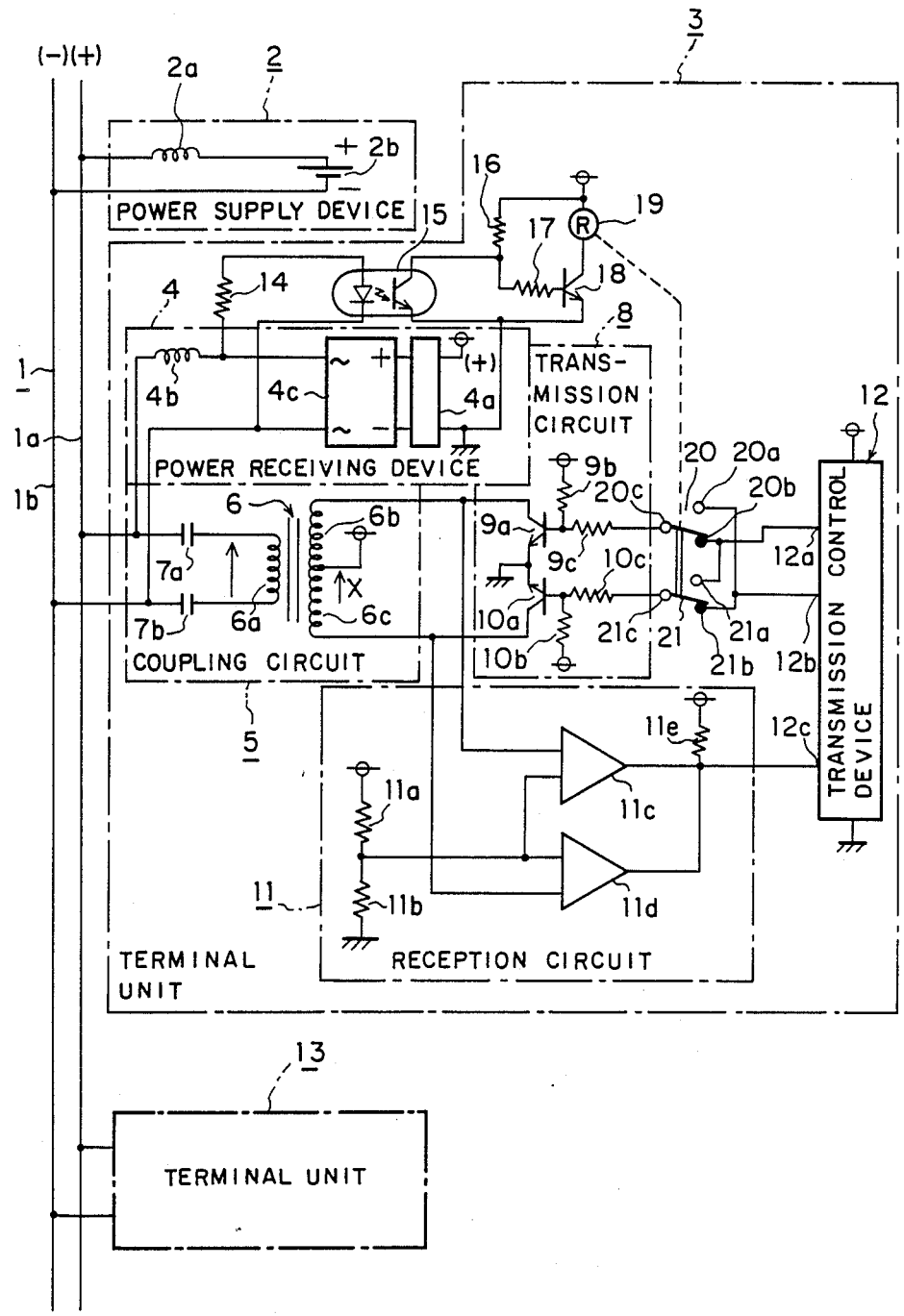
FIG. 4 is a circuit diagram showing an information transmission apparatus according to a first embodiment of the present invention.

FIG. 4 is a block diagram of an information transmission apparatus according to a first embodiment of the present invention. Referring to FIG. 4, a power receiving device 4 includes an inductance 4b disposed on its input side for serving as a high impedance to the transmitted signal and a full-wave rectifier circuit 4c connected in series therewith having a stabilizer circuit 4a connected to its output. There is a resistor 14 connected at one end with one input terminal of the full-wave rectifier circuit 4c and at its other end with the anode of a light emitting diode of a photocoupler 15. The cathode of the photocoupler 15 is connected with the other input terminal of the full-wave rectifier circuit 4c. The emitter of the photocoupler 15 and the emitter of a transistor 18 together are connected with the ground of the power receiving device 4 and the collector of the photocoupler 15 is connected through a resistor 16 with the positive line of the power receiving device 4 and also connected through a resistor 17 with the base of the transistor 18. The collector of the transistor 18 is connected through a relay 19 with the positive line of the power receiving device 4. Contacts 20 and 21 of the relay 19 are connected, respectively, between output terminals 12a, 12b of a transmission control device 12 and resistors 9c, 10c connected in series with the bases of transistors 9a, 10a. More particularly, while common contacts 20c, 21c of the contacts 20, 21 are connected with one end of the resistors 9c, 10c, a normally open contact 20a is connected with a normally closed contact 21b and a normally closed contact 20b is connected with a normally open contact 21a. Further, the normally open contact 20a and normally closed contact 21b are connected with the output terminal 12b of the transmission control device 12, whereas the normally closed contact 20b and normally open contact 21a are connected with the output terminal 12a of the transmission control device 12.

Description of operation of the apparatus with the above described organization will be given below.

Figure 1A:
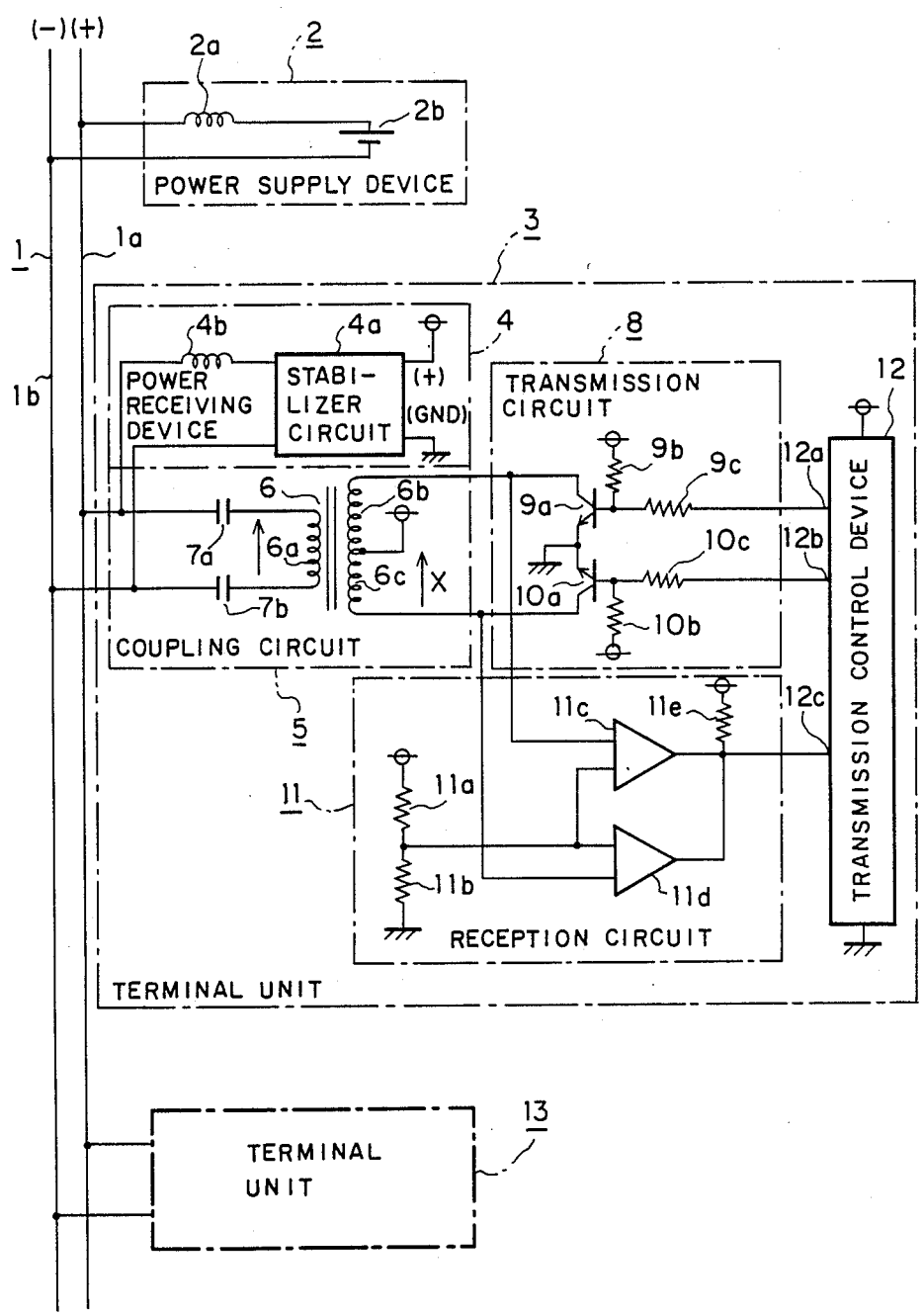
FIG. 1A is a circuit diagram of a prior art information transmission apparatus.

When the input terminal of the terminal unit 3 is connected to the transmission line 1, a supply voltage from the power supply unit 2 is full-wave rectified in the full-wave rectifier circuit 4c and converted to a predetermined voltage value by the stabilizer circuit 4a to be supplied to every circuit of the terminal unit 3. The supply voltage from the transmission line 1 is applied through the resistor 14 to the light emitting diode of the photocoupler 15 in the forward direction whereby the photo-transistor is turned ON. Hence, no base current flows in the transistor 18, and thereby, the transistor 18 remains OFF and the relay 19 is held in an unoperating state. Therefore, relative to the contact 20, the normally closed contact 20b is in connection with the common contact 20c, and relative to the contact 21, the normally closed contact 21b is in connection with the common contact 21C. In such a condition, the output terminal 12a of the transmission control device 12 is connected through the contact 20 and resistor 9c with the base of the transistor 9a, while the output terminal 12b is connected through the contact 21 and resistor 10c with the base of the transistor 10a. In such a situation, it is possible to deliver the signal of the same polarity as that of the supply voltage, that is, of the same polarity as the code "0" of the start bit of each character, to the transmission line 1 by sending the output from the output terminal 12b of the transmission control device 12 through the transformer 6, the same as in the prior art organization as shown in FIG. 1A. On the other hand, the output from the output terminal 12a of the transmission control device 12 can deliver a signal of the polarity reverse to that of the supply voltage to the transmission line 1. Thus, it is made possible to achieve series transmission of an AMI coded baseband signal superposed on the supply voltage.

The case, in contrast to the above, where the terminal unit 3 is connected to the transmission line 1 in reverse polarity relation, that is, the capacitor 7b is connected to the positive line 1a of the transmission line 1 and the capacitor 7a is connected to the negative line 1b, will be described below.

Even in this case, since the supply voltage from the transmission line 1 is full-wave rectified in the full-wave rectifier circuit 4c, the normal voltage is supplied through the stabilizer circuit 4a to every circuit within the terminal unit 3. On the other hand, the voltage applied to the light emitting diode of the photocoupler 15 becomes that of the reverse polarity so that the phototransistor is turned OFF. As a result, the transistor 18 is supplied with a base current, whereby the transistor 18 is turned ON and the relay 19 is operated. Hence, relative to the contact 20 of the relay 19, the normally open contact 20a is put into connection with the common contact 20c, and relative to the contact 21, the normally open contact 21a is put into connection with the common contact 21c. In this situation, the output terminal 12b of the transmission control device 12 is connected through the contact 20 and resistor 9c to the base of the transistor 9a, while the output terminal 12a is connected through the contact 21 and resistor 10c to the base of the transistor 10a. As a result, the signal generated in the winding 6a of the transformer 6 caused by the output from the output terminal 12b of the transmission control device 12, which is for outputting the signal of the same polarity as that of the supply voltage, becomes that of the polarity reverse to the arrow X in FIG. 4. However, since the connection to the transmission line 1 is made in the reverse polarity relation, the signal of the same polarity as the supply voltage can be delivered to the transmission line 1 and the delivered signal becomes that of the same polarity as the code "0" of the start bit of each character. On the other hand, the output terminal 12a of the transmission control device 12 is enabled to deliver to the transmission line 1 the signal of the reverse polarity to that of the supply voltage. Thus, it becomes possible to make serial transmission of an AMI coded base-band signal superposed on the supply voltage.

In the described manner, it is enabled to deliver the transmission signal of the same polarity as that of the supply voltage to the transmission line 1 by the output of the output terminal 12b, regardless of the polarity in the connection of the terminal unit 3 to the transmission line 1, without modifying the transmission control device 12.

Although, in the above first embodiment, the case where the contacts 20, 21 are interposed between the transmission control device 12 and the transmission circuit 8 was exemplified, the contacts 20, 21 may be disposed between the winding 6a of the transformer 6 and the capacitors 7a, 7b, between the capacitors 7a, 7b and the input terminal of the terminal unit 3, or between the collectors of the transistors 9a, 10a and the transformer 6.

Figure 5:
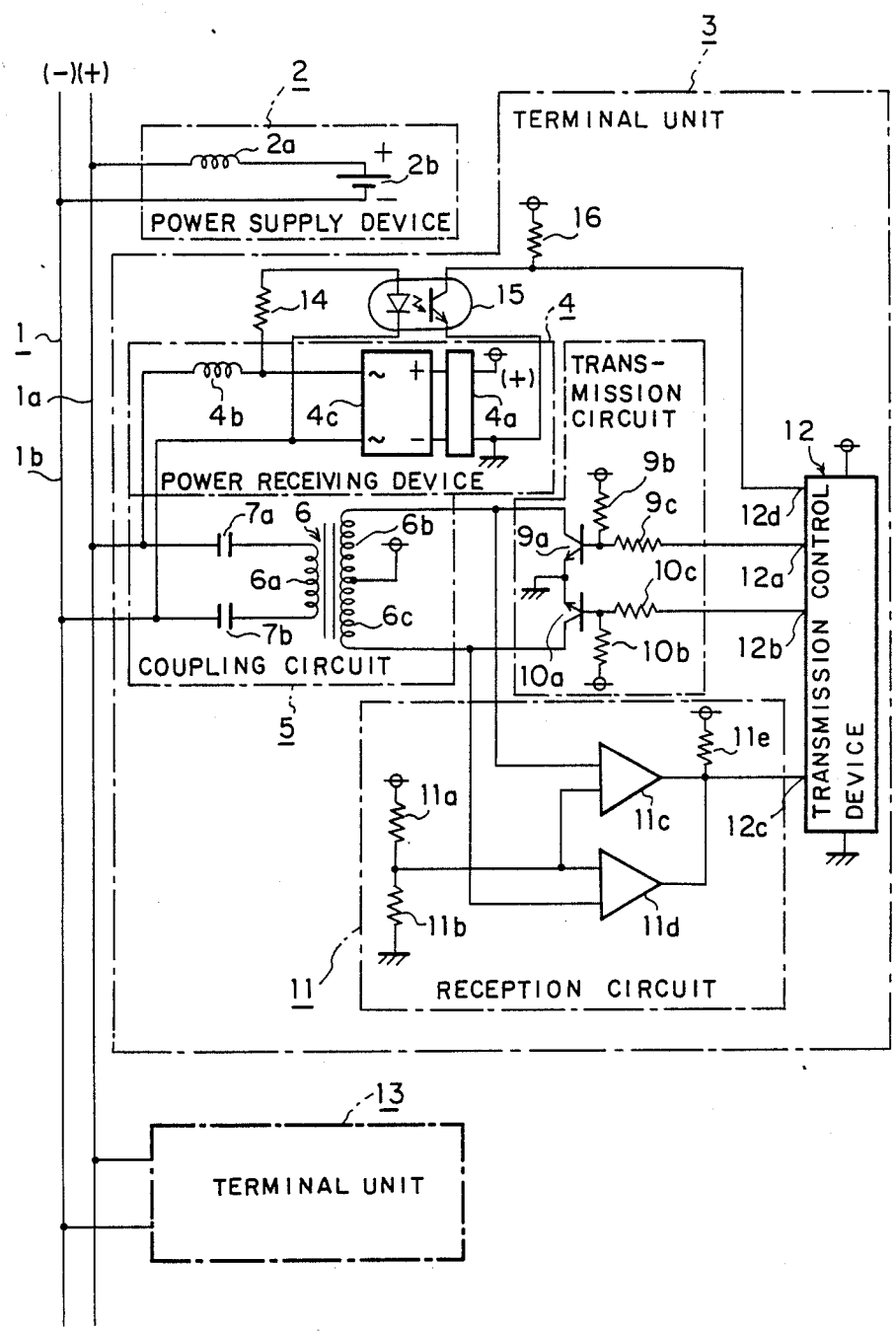
FIG. 5 is a circuit diagram showing an information transmission apparatus according to a second embodiment of the present invention.
Figure 6:
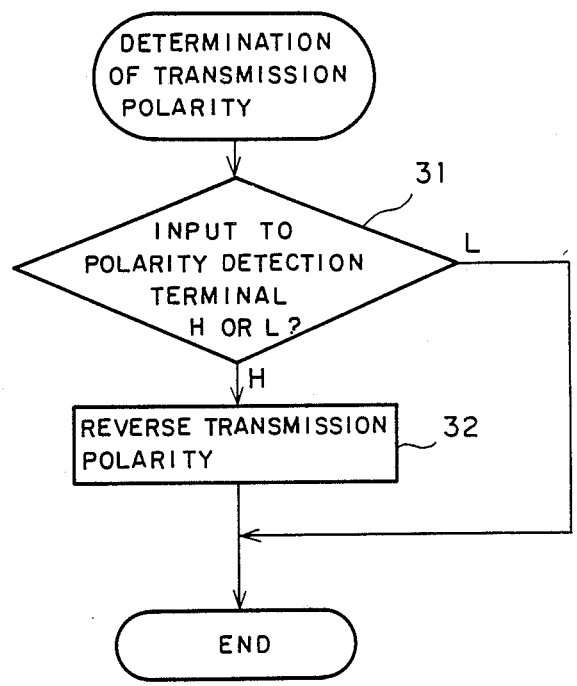
FIG. 6 is a flow chart for explaining a controlling method applied to the arrangement of FIG. 5.

Although in the above first embodiment the polarities of the transmission signal are switched by contacts of the relay 19, it is also possible to arrange an apparatus such that, as shown in the block diagram of a second embodiment of FIG. 5, the output of the phototransistor of the photocoupler 15 is output to a control terminal 12d provided on the transmission control device 12, whereby the polarity of each of the outputs of the output terminal 12a and the output terminal 12b is determined. In this case, the transmission control device 12 is provided with a program as shown in the flow chart of FIG. 6 incorporated therein, whereby the decision whether the level of the input to the control terminal 12d, i.e., the polarity detection terminal, is HIGH or LOW is made in a routine 31, and when the level is HIGH, the transmission polarity is reversed in a routine 32.

Further, in the above described first and second embodiments, the power receiving device 4 including the full-wave rectifier 4c was arranged so as to use the voltage supplied to the transmission line 1 for supplying power to the terminal unit 3, but the power operating the terminal unit 3 can be supplied from another system such as the commercial power source without impairing the applicability of the present invention.

Figure 1B:
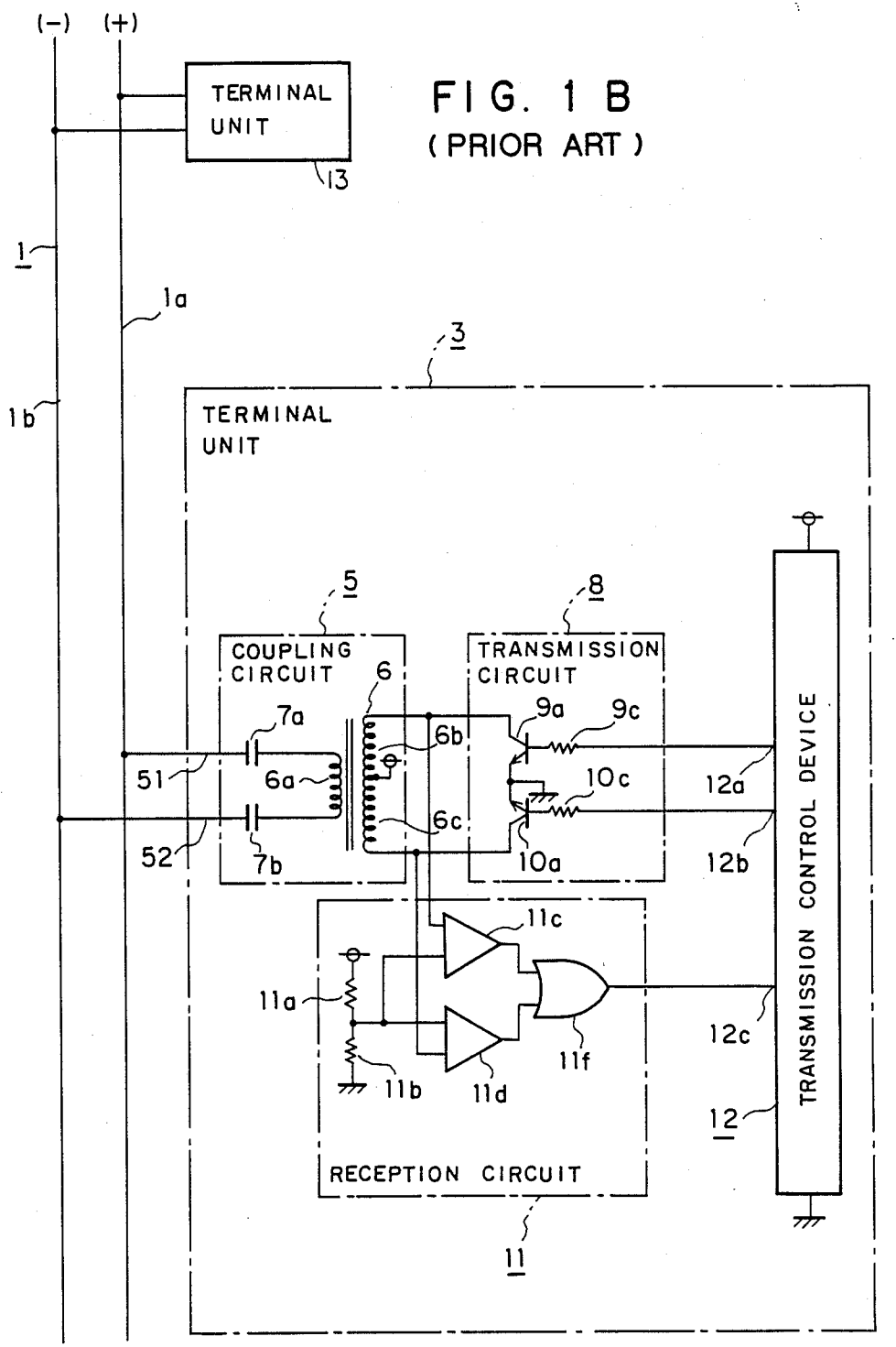
FIG. 1B is a circuit diagram showing a prior art information transmission apparatus.
Figure 7:
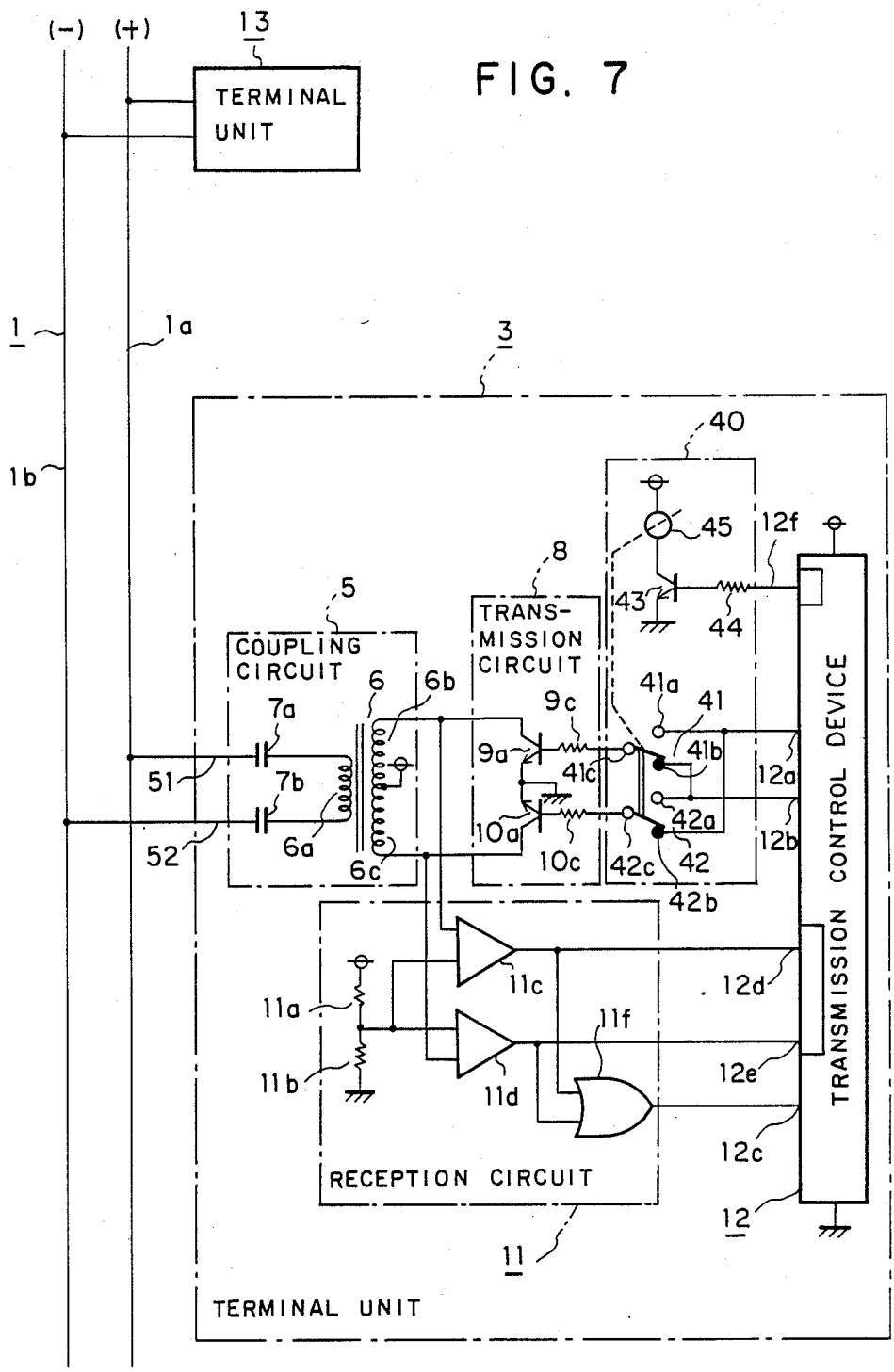
FIG. 7 is a circuit diagram showing an information transmission apparatus according to a third embodiment of the present invention.

A third embodiment of the present invention will be described with reference to the accompanying drawings. Referring to FIG. 7, wherein like reference numerals to those in the above described FIG. 1B denote corresponding parts, 11 denotes a reception circuit and output terminals of comparators 11d, 11c as the constituents of the reception circuit 11 are connected with polarity identification terminals 12d, 12e of the transmission control device 12. That is, when the signal line 1a of the transmission line 1 is of the positive polarity, the terminal 12d goes to a high level, and when it is of the reverse polarity, the terminal 12e goes to a high level. Reference numeral 40 denotes a polarity switching circuit, and this polarity switching circuit 40 is made up of a transistor 43 whose base terminal is connected through a resistor 44 with a switching terminal 12f provided on the transmission control device 12 and whose emitter is grounded, a relay 45 connected with the collector of the transistor 43, and two poles of contacts 41, 42 of the relay 45.

The normally open contact 41a of the contact 41 and the normally closed contact 42b of the contact 42 are joined together and connected with the transmission terminal 12a. And, the normally closed contact 41b of the contact 41 and the normally open contact 42a of the contact 42 are joined together and connected with the transmission terminal 12b.

On the other hand, the common contact 41c, 42c of the contacts 41, 42 are, respectively, connected through resistors 9c, 10c with bases of transistors 9a, 10a of the transmission circuit 8. The switching terminal 12f, after power-on resetting, outputs a high level when the polarity identification terminal 12e has gone to a high level earlier than the identification terminal 12d, and outputs a low level when reversely the identification terminal 12d has gone to a high level earlier.

The transmission control device 12 is constituted of a microcomputer and the like and the identification of the polarity and outputting signals to the switching terminal 12f and transmission terminals 12a, 12b are achieved by software.

The transmission terminal 12b for transmitting the start bit goes to a high level during the one-bit period when the code "0" as the start bit is transmitted. And, when the code "0" is transmitted in the next place, the transmission terminal 12a goes to a high level, and thereafter, each time the code "0" is transmitted, they alternately go to a high level, whereby an AMI signal is transmitted over the transmission line 1.

Figure 8:
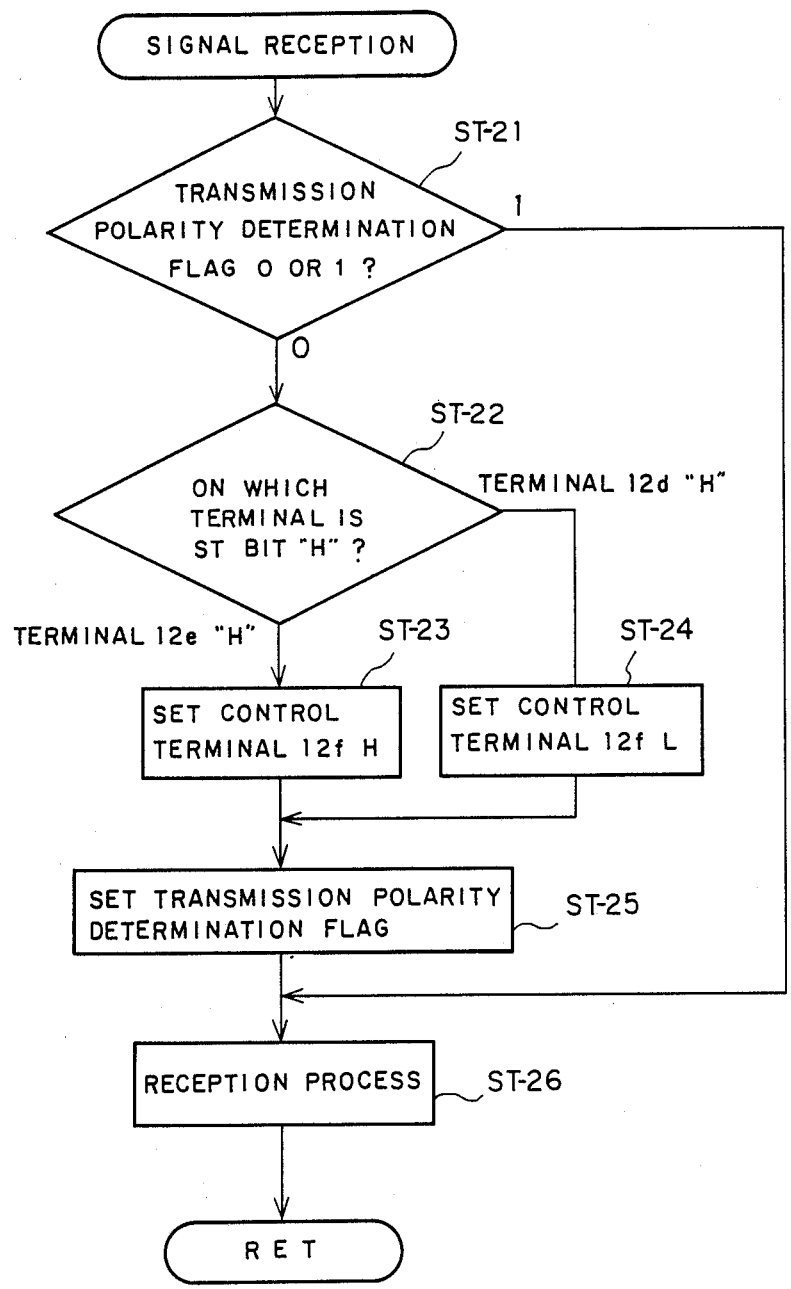
FIG. 8 is a flow chart showing operation of the same.

FIG. 8 is a flow chart showing the relative operation. Description of the operation will be given below with reference to the flow chart. When the input terminal 51 of the terminal unit 3 is connected to the signal line 1a and the power source (not shown in FIG. 7) is applied thereto, the transmission control device 12 is put into a stand-by state for reception.

Figure 2:
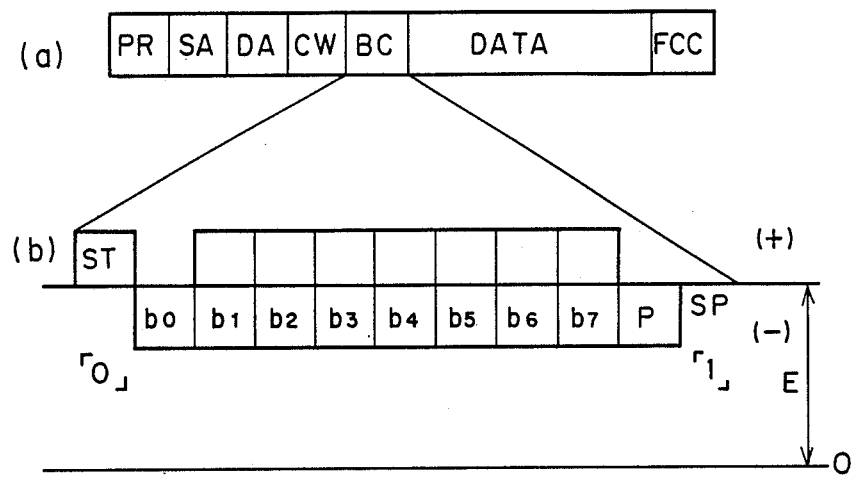
FIG. 2 is an explanatory drawing of packet structure and character structure for information transmission.
Figure 3:
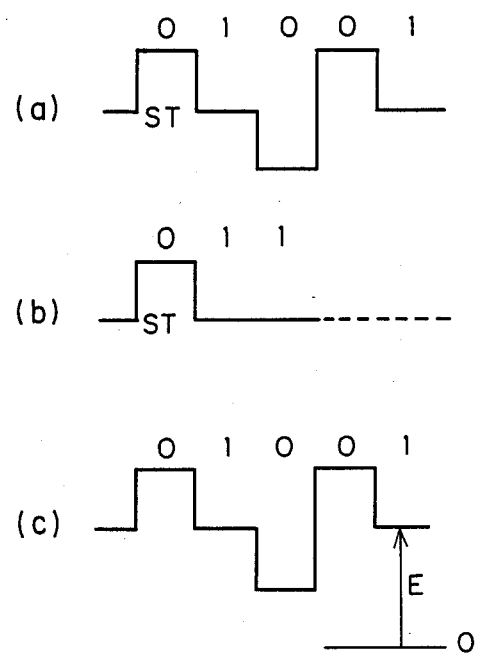
FIG. 3 is an explanatory drawing showing relation between a signal transmitted over a transmission line and signals delivered from terminal units.

At this time, a signal of the packet structure and character structure as shown in FIG. 2 is transmitted from another terminal unit 13 to the transmission line 1. That is, the code "0" as the start bit (ST) transmitted in positive polarity relation to the signal line 1a is applied through the capacitors 7a, 7b to the winding 6a.

The signal for the start bit (ST) is turned to an induced voltage in the winding 6b and compared in the comparator 11c with a reference voltage obtained by means of resistors 11a, 11b for identification of its level. When the received voltage is higher than that, it is taken as a transmission of a code "0" and a high level is output to the polarity identification terminal 12d for identification of the code "0" of the transmission polarity, and also, it is applied as a received signal to the signal reception terminal 12c through the OR circuit 11f.

The transmission control device 12, in a stand-by state for signal reception, is monitoring the polarity identification terminals 12d, 12e at all times. When a code "0" of the received data is applied to the signal reception terminal 12c, the transmission control device 12 starts a reception process and sees a transmission polarity determination flag (step ST-21).

If the flag is "0", that is, if the transmission polarity is not yet determined, then it is identified on which terminal of the polarity identification terminals 12d, 12e a start bit (ST) is impressed (step ST-22).

Since, now, the terminal 12d is at a high level, the control terminal 12f is set to a high level (step ST-23), whereby the transistor 43 is turned ON and the relay 9 is operated. As a result, the normally open contacts 41a, 42a are closed and the transmission terminal 12a is connected to the base of the transistor 9a and the transmission terminal 12b is connected to the base of the transistor 10a, respectively.

Then, the transmission polarity determination flag is set (step ST-25) and data are received from the reception terminal (step ST-26). Thereafter, when a request for transmission is made thereto, the transmission control device 12, after confirming that the transmission line 1 is idle the same as in the case of the prior art, transmits the code "0" as the start bit of the PR (priority code) as shown in the above FIG. 2. That is, the start bit transmission terminal 12b is held at a high level for a one-bit period and the transistor 10a is turned ON, whereby the start bit is transmitted in such polarity that the signal line 1a of the transmission line 1 is provided with positive polarity. Thereafter, the transmission terminals 12a, 12b are alternately brought to a high level each time the code "0" is transmitted according to the AMI code, and thereby a signal is transmitted in the AMI code.

When such a case is imagined that the input terminals 51, 52 of the terminal unit 3 are connected in the reverse polarity to that shown in the figure, namely, the input terminal 51 is connected to the signal line 1b and the input terminal 52 is connected to the signal line 1a, and the power supply is turned on, and if then the signal from the terminal unit 13 the same as that in the above described embodiment is transmitted, the start bit (ST) is given in positive polarity relation to the signal line 1a. Thereby, the winding 6a is impressed thereon with a voltage of the positive polarity relative to the capacitor 7b and the voltage induced in the winding 6c is subjected to level comparison in the comparator 11d, whereby the polarity identification terminal 12e is brought to a high level.

Since the terminal 12e is at a high level in the polarity identification of the start bit (ST) (step ST-22), the control terminal 12f is set to a low level (step ST-24), whereby the relay 45 is turned OFF. That is, the start bit transmission terminal 12b is connected through the normally closed contact 41b and resistor 9c to the base of the transistor 9a.

If a request for transmission is made to the transmission control device 12 in the described state, the start bit transmission terminal 12b is brought to a high level, the transistor 9a is turned ON, and the code "0" of the start bit providing the capacitor 7b with positive polarity is transmitted to the winding 6a of the coupling transformer 6. As a result, since the input terminal 52 is connected with the signal line 1a, it is made possible to transmit the start bit so that the signal line 1a is provided with positive polarity.

Although, in the above described third embodiment, the switching of the transmission polarities for the start bit is adapted to be performed by the relay contacts as the switching element inserted between the transmission terminals 12a, 12b and the transmission circuit 8, the switching element may be inserted between the transmission circuit 8 and the coupling circuit 5 or between the input terminals 51, 52 and the transmission line 1.

Further, the switching of the polarities may be carried out by software provided in the transmission control device 12 adapted such that, in the process after the identification of the polarity of the start bit (ST) as shown in FIG. 8 (step ST-22), the transmission terminal 12b is provided with the function of the start bit transmission terminal instead of the setting of the control terminal 12f to a high level (step ST-23), and the transmission terminal 12a is provided with the function of the start bit transmission terminal instead of the setting of the control terminal 12f to a low level (step ST-24).

When power is turned on simultaneously for all the terminal units, some terminal units become unable to make transmission, and therefore, it may be arranged such that certain terminal units will transmit a signal indicating the start bit for polarity identification when a predetermined period has elapsed after the turning on of the power.

The polarity identification signal may be transmitted, for example, with one character of the packet as shown in FIG. 2(a) set to the codes "0" or with the start bit (ST) and the 0-th bit (b0) of the character as shown in FIG. 2(b) set to the codes "0". It will work well only by setting the period longer than the maximum length of the packet. The case described above was that where a baseband signal was transmitted coded in the AMI mode but other way of coding such as the NRZ mode may also be used.

Figure 9:
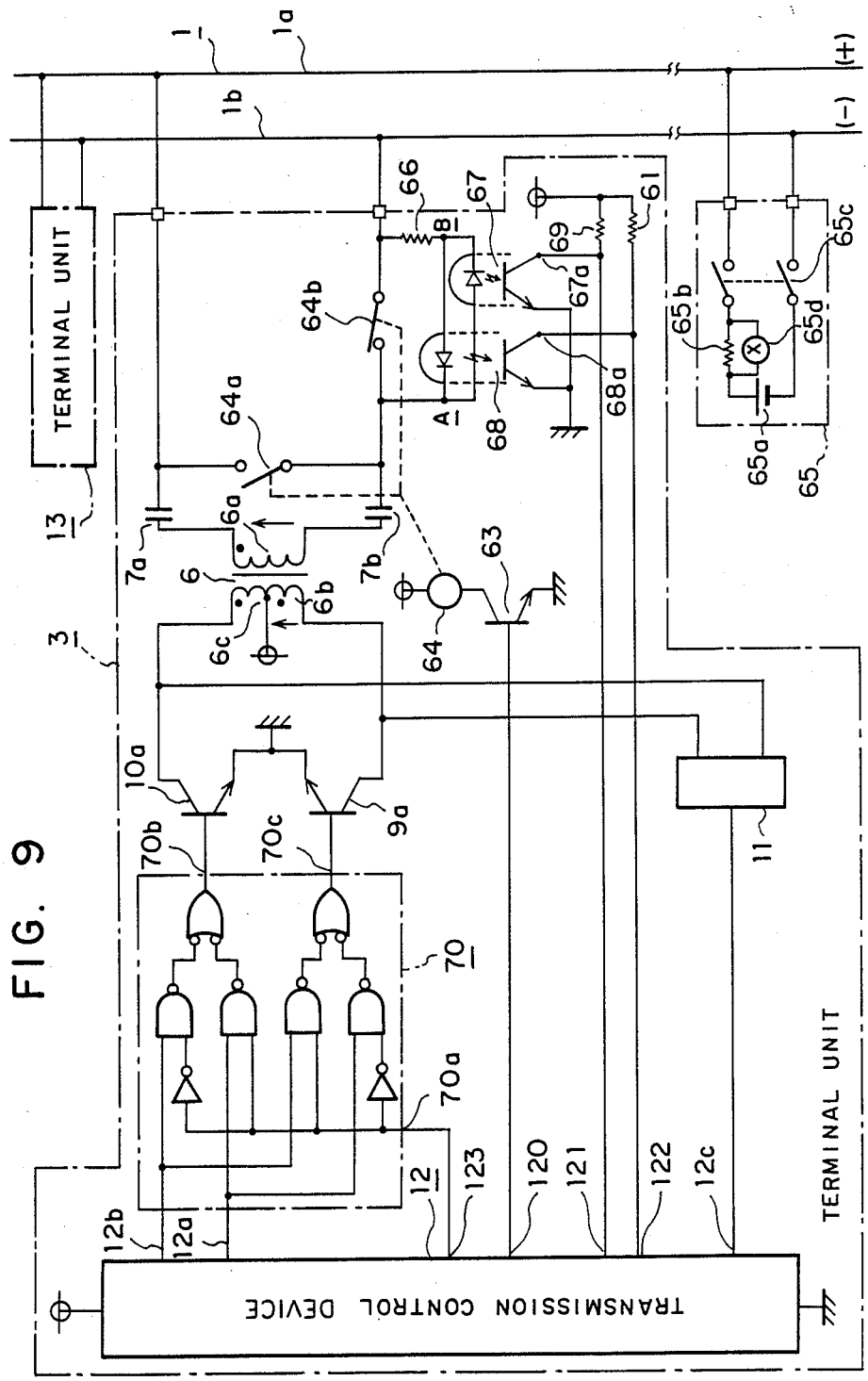
FIG. 9 is a circuit diagram showing an information transmission apparatus according to a fourth embodiment of the present invention.

The fourth embodiment of the present invention will be described below with reference to the accompanying drawings. Referring to FIG. 9, reference numeral 120 denotes a polarity detection signal output terminal newly provided on the transmission control device 12, from which the signal is output when the transmission control device 12 reads the polarity of the transmission line 1. Reference numeral 63 denotes a whose base terminal is connected with the polarity detection output terminal 120, for driving a relay 64 connected with its collector terminal. Reference numerals 64a, 64b are contacts of the relay 64, of which the contact 64a is a make contact and the contact 64b is a break contact. Reference numeral 65 denotes a polarity setting device and a case where a polarity is indicated by a D.C. current is illustrated. Reference numeral 65a denotes a power source for supplying the transmission line 1 with a D.C. current, 65b denotes a current limiting resistor connected with the power source 65a, 65c denotes a switch for switching on and off the D.C. current indicating the polarity, 65d denotes a current detector connected across the current limiting resistor 65b for detecting the current quantity. Reference numeral 66 denotes a current limiting resistor, whereby too large an amount of D.C. current indicating the polarity is prevented from flowing into the terminal unit 3, and it is connected with light emitting diodes constituting photocouplers 67, 68. The photocouplers 67, 68 provide a polarity detection circuit of the transmission line 1, whose output terminals 67a, 68a are connected through pull-up resistors 69, 61 with the power source and also connected with polarity detection input terminals 121, 122 of the transmission control device 12. Reference numeral 123 denotes an output terminal of a polarity setting signal for switching the transmission polarities of the baseband signal depending upon signals input to the polarity detection input terminals 121, 122 and it is connected with a control input terminal 70a of a polarity switching circuit 70. Reference numerals 70b, 70c denote output terminals of the polarity switching circuit 70 and these are connected with the base terminals of transistors 10a, 9a respectively. And the output terminals 70b, 70c deliver outputs of a transmission data positive output terminal 12a and a transmission data negative output terminal 12b selected by the control input terminal 70a.

Figure 1C:
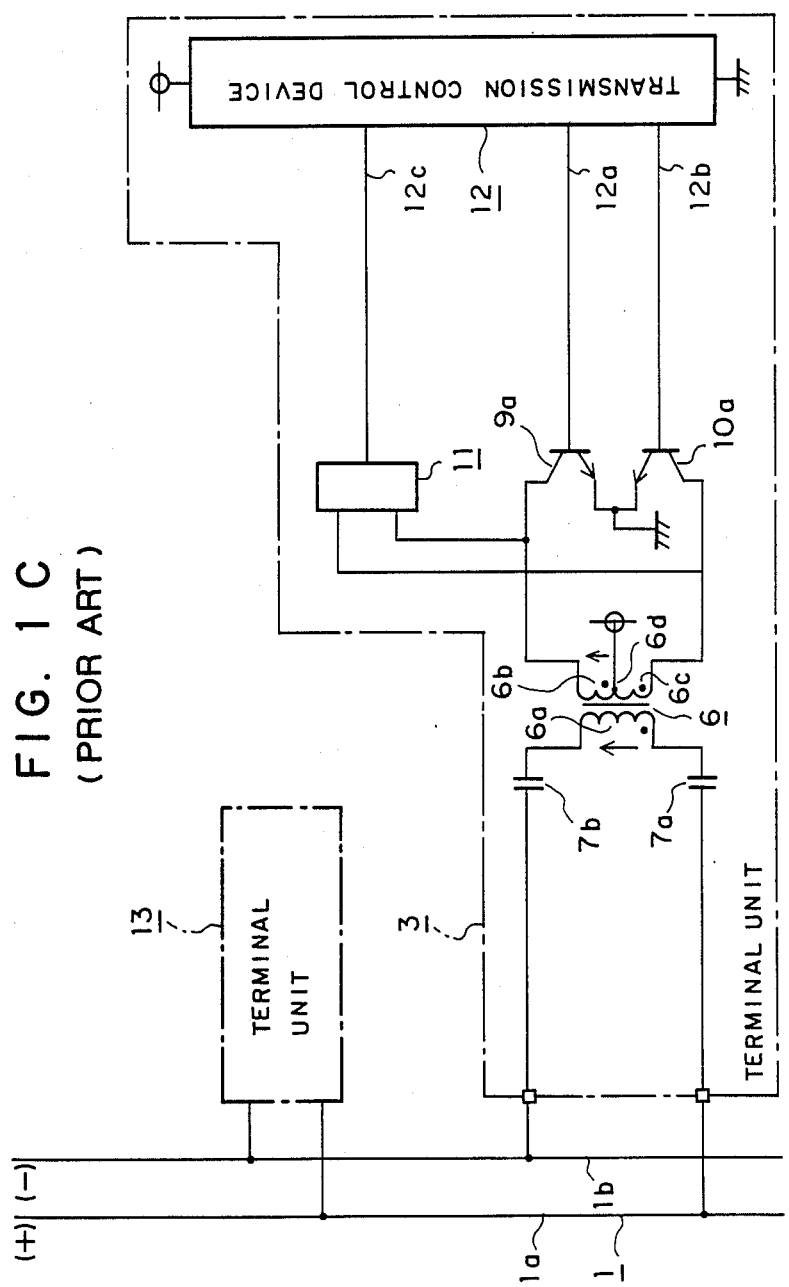
FIG. 1C is a circuit diagram showing a prior art information transmission apparatus.
Figure 10:
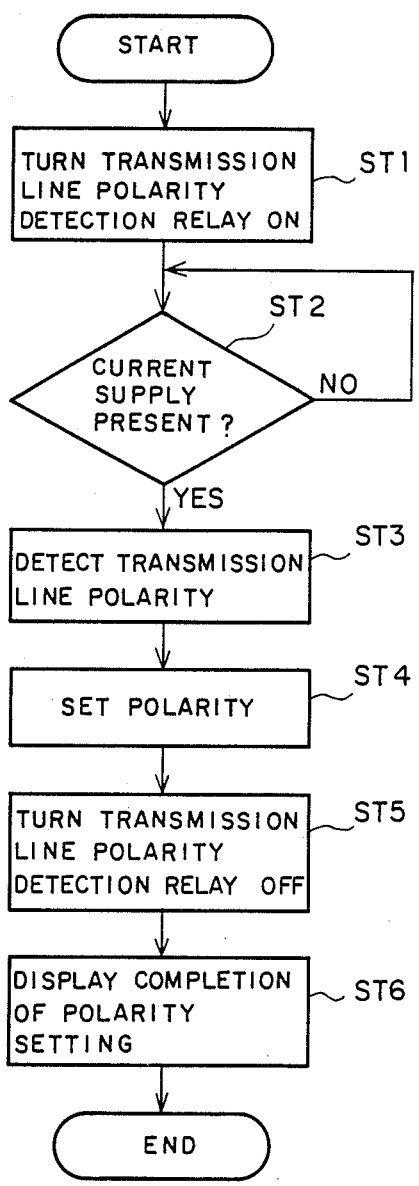
FIG. 10 is a flow chart showing operation of the information transmission apparatus according to the fourth embodiment of the present invention.

Description of the operation will be given below with reference to the flow chart of FIG. 10. The case where the terminal unit 3 is connected in the polarity as shown in FIG. 9 will be explained. The transmission control device 12 is initialized upon turning on of the power source and then a polarity setting sequence of the transmission line as shown in FIG. 10 is executed. The transmission control device 12 outputs a high level signal from the polarity detection signal output terminal 120 and supplies a base current to the transistor 63. The transistor 63 is thereby turned ON and the relay 64 is operated (step ST-1). Thus, the contact 64a is closed, while the contact 64b is opened, and a loop passing through the positive line 1a of the transmission line 1→contact 64a→LEDs of the photocouplers 67, 68→current limiting resistor 66→negative line 1b is thereby formed. Since, in the present situation, no current is supplied from the polarity setting device 65, outputs of the photocouplers are both at a high level, and the transmission control device 12, reading the input levels at the polarity detection input terminals 121, 122, detects the fact of there being no current supply (step ST-2). If then the switch 65c of the polarity setting device 65 for indicating the polarity is closed, a current is supplied through the transmission line 1 to the terminal unit 3. In the case where the connection is made as shown in FIG. 9, the current flows from the point A to the point B, and therefore, the photocoupler 67 is turned ON and its output goes to a low level. The transmission control device 12 detects the start of the current supply by reading the levels of the polarity detection input terminals 121, 122, and further reads the polarity detection input terminals 121, 122 several times, and thereby reads the polarity of the transmission line 1 indicated by the polarity setting device 65 (step ST-3). The transmission control device 12, according to the read value, brings the output of the polarity setting signal output terminal 123 to a high level and supplies it to the control input terminal 70a of the polarity switching circuit 70. The polarity switching circuit 70 operates such that the signal of the output terminal 12a is delivered to the output terminal 70c and the signal of the output terminal 12b is delivered to the output terminal 70b. That is, the polarity setting is carried out (step ST-4). Then, the transmission control device 12 brings the polarity detection output terminal 120 to a low level and turns OFF the transistor 63 (step ST-5), whereby the contacts 64a, 64b of the relay 64 are reset. Thus, the polarity for the transmission line 1 is set up. When the setting of polarity of both the terminal units 3, 13, is finished, the current ceases to flow through the transmission line 1. The polarity setting device 65 detects there being no current flowing by the current detector and thereby recognizes completion of the polarity setting and makes a display of the fact (step ST-6). After the recognition of the completion of the setting, the polarity setting device 65 opens the switch 65c to get isolated from the transmission line 1. If, in the present situation, a request for transmission is made to the transmission control device 12, the signal at the output terminal 12a is applied to the base of the transistor 9a the same as in the prior art terminal unit as shown in FIG. 1c, whereby the start bit is output to the positive signal line 1a. In the case where the terminal unit 3 is connected in polarity relation reverse to that in FIG. 9, the polarity setting is similarly made, whereby each of the terminal units 3, 13 is enabled to transmit a baseband signal in the polarity as indicated by the polarity setting device 65 and the "CSMA/CD with one unit remaining undefeated" is achieved. And, since the polarity detection portion unnecessary for signal transmission is cut off after the polarity setting, it does not adversely affect the signal transmission and information transmission is smoothly carried out. Further, the power needed for setting the polarity is only required at the time of the setting up and it need not be supplied from outside at all times.

Figure 11:
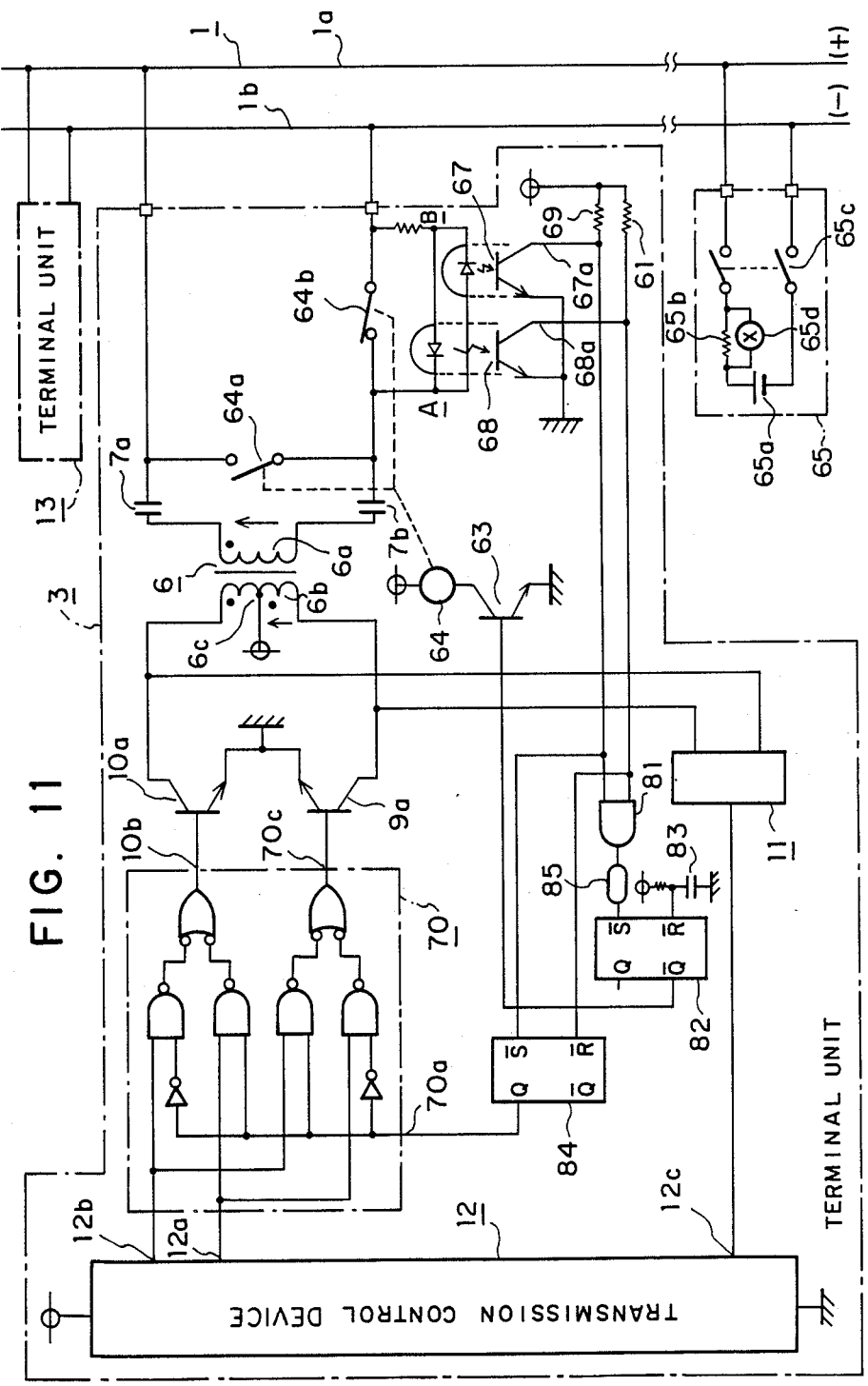
FIG. 11 is a circuit diagram showing an information transmission apparatus according to a fifth embodiment of the present invention.

Although, in the above fourth embodiment, the outputs of the photocoupler 67, 68 were read into the transmission control device 12 and thereby the transmission polarity of the baseband was determined, similar effect can be obtained even if the polarity identification means is disposed outside the transmission control device 12. Shown in FIG. 11 is an example of such arrangement, a fifth embodiment of the present invention, wherein, when the power is supplied to the terminal unit 3, a flip-flop 82 is reset by a power-on reset circuit 83 connected with its reset input terminal R, whereby the negative logical output Ω is brought to a high level and the transistor 63 is turned ON, and thus, a polarity detection circuit similar to that in the above described fourth embodiment is formed. Outputs of the photocouplers 67, 68 are input to an AND gate 81, and also, to the set terminal S and reset terminal R of a flip-flop 84. If a current is supplied from the polarity setting device 65 to the transmission line 1, either one of the outputs of the photocouplers 67, 68 is brought to a low level and the output Q of the flip-flop 84 supplies a signal corresponding to the polarity of the transmission line 1 to the polarity switching circuit 70. Meanwhile, the output of the AND gate 81 is also brought to a low level and input through a delay element 85 to the set terminal S of the flip-flop 82. Therefore, the negative logical output Ω of this flip-flop 82 goes to a low level, whereby the transistor 63 is turned OFF and the polarity detection circuit is cut off, and thus, the polarity setting operation is completed. The polarity setting device 65 detects the fact that a current is not flowing any more by means of a current detector 65d, opens the switch 65c, and ends its operation.

According to the present invention as described above, an information transmission apparatus which enhances work-ability at the time of its installation and reliability on its functioning is made obtainable, since the apparatus is provided with a means to detect the polarity of the voltage supplied to the transmission line and a switching arrangement for switching the polarities of a signal to be transmitted superposed on the supply voltage over the transmission line depending upon the detection signal, and a non-polarized connection between the transmission line and terminal unit is thereby achieved.

And, according to the present invention, such an effect is made obtainable that errors in connection work can be prevented at the time when a terminal unit is connected to a transmission line, since, at that time, a non-polarized connection of the input terminal of the terminal unit is attained by the arrangement in the terminal unit that the polarity of the start bit received at first upon turning on of the power supply thereto is detected and the transmission polarities are switched depending upon the detection output.

Further, according to the present invention, such an effect is made obtainable that trouble in the transmission system due to errors in installation work of the terminal unit can be prevented, since a normal information transmission is made achievable without confirming polarity relation between the terminal unit and the transmission line when they are connected by constituting the terminal unit of a device for detecting a signal from a polarity setting unit connected to the transmission line and a circuit for switching the polarities of the transmission signal depending upon the detection output.

What is claim is:

1. In a terminal unit for use in an information transmission system disposed between an information transmission line in the information transmission system constituted of signal lines, having a steady state, unidirectional direct current voltage applied thereto, for transmitting a signal by conduction therethrough of direct current information signals having positive polarity and negative polarity with respect to said direct current voltage and controlled equipment as one terminal of the system and including at least a coupling circuit for transmitting and receiving a signal to and from the transmission line by converting the signal into a direct current as aforesaid and converting such a direct current into the signal, a transmission control device controlling transmission and reception of a signal according to a protocol for signal transmission, and a transmission circuit and a reception circuit disposed between said coupling circuit and transmission control device for making signal transmission and reception, respectively, said terminal unit for use in an information transmission system comprising:

a polarity detection circuit for detecting the polarity of said steady state, unidirectional direct current voltage supplied to said signal lines; and a polarity switching circuit for switching polarities of the direct current information signals delivered to said transmission line depending upon the result of detection in said polarity detection circuit for establishing and maintaining a preselected relationship between the logic represented by the polarities of said direct current information signals and the polarity of said steady state, unidirectional direct current voltage.

2. A terminal unit according to claim 1 further comprising a power receiving circuit disposed between said coupling circuit and said polarity detection circuit including at least an inductance serving as a high impedance to a transmitted signal and a stabilizer circuit for voltage stabilization, said power receiving circuit being provided with a full-wave rectifier circuit connected in series with said inductance and the output thereof being connected with the input of said stabilizer circuit.

3. A terminal unit according to claim 1, wherein said polarity detection circuit is constituted of a resistor connected through an inductance of a power receiving circuit and in series with a photocoupler, whose anode side is connected with said resistor and whose cathode side is connected with the input side of a full-wave rectifier circuit, and which includes a light emitting diode and a phototransistor, and said polarity switching circuit is constituted of a switching transistor, whose emitter is connected with the emitter of said photocoupler and whose base is connected with the collector of said photocoupler, and a relay connected between the collector of said transistor and the junction point of said photocoupler and the base of said transistor with its contacts disposed between outputs of said transmission control device and inputs of said transmission circuit.

4. A terminal unit according to claim 3, wherein said contacts of said relay consist of a first contact, which has a normally open contact, a normally closed contact, and a common contact to be connected with either of said contacts depending upon a switching output, and a second contact, which has a normally open contact connected in juxtaposition with the normally closed contact of said first contact, a normally closed contact connected with the normally open contact of said first contact, and a common contact, and outputs from two output terminals of said transmission control device to said transmission circuit are switched by changing over of said contacts depending upon the result of detection in said polarity detection circuit, whereby the polarities of a signal transmitted to the transmission line are adapted to be switched.

5. A terminal unit according to claim 1, wherein
said polarity detection circuit is constituted of a resistor connected through an inductance of a power receiving circuit and in series with a photocoupler, whose anode side is connected with said resistor and whose cathode side is connected with the input side of a full-wave rectifier circuit, and which includes a light emitting diode and a phototransistor, and
said polarity switching circuit is constituted of a control terminal for polarity detection disposed on said transmission control device for receiving a detection output of said photocoupler and a logical operator disposed within said transmission control device and provided with a polarity switching program including at least a routine for identifying whether the level of the detection output is high or low and a routine for reversing the transmission polarity depending upon the result of identification executed in said identifying routine.

6. A terminal unit according to claim 1, wherein said polarity detection circuit detects the polarity of a start bit which has come in at first after the power source was turned on and the polarity switching circuit switches the polarities of an encoded baseband signal to be delivered to said information transmission line depending upon the output of said polarity detection circuit.

7. A terminal unit according to claim 6, wherein
said polarity detection circuit is constituted of two polarity identification terminals provided on said transmission control device for receiving outputs of two comparators provided in said reception circuit and a logical operator for identifying the polarity of a signal over the transmission line depending upon the two inputs at said polarity determination terminals, and
said polarity switching circuit is constituted of a switching terminal provided on said transmission control device for delivering a switching signal depending upon the output of said logical operator, a switching transistor whose base side is connected with said switching terminal, and a relay connected with the collector of said switching transistor with its contacts disposed between output terminals of said transmission control circuit and input terminals of said transmission circuit.

8. A terminal unit according to claim 7, wherein said polarity detection circuit is constituted of a microcomputer having a routine for determining the polarity of a signal and also having a routine for controlling outputs delivered to said switching terminal and output terminals.

9. A terminal unit according to claim 6, wherein said baseband signal delivered to said information transmission line is coded in the alternate mark inversion (AMI) mode.

10. A terminal unit according to claim 9, wherein said polarity detection circuit is adapted to transmit a start bit identification signal for identifying said start bit to said transmission line.

11. A terminal unit according to claim 1, wherein
said polarity detection circuit is adapted to detect the signal polarity of said transmission line depending upon an output of a polarity setting device outputting the signal for indicating the polarity to said transmission line, and
said polarity switching circuit is adapted to switch the polarity of an encoded baseband signal to the polarity having a predetermined relation with the polarity indicated by said polarity setting device.

12. A terminal unit according to claim 11, wherein said polarity detection circuit includes a current limiting resistor for preventing inflow of a large direct current, photocouplers for polarity detection each provided with a light emitting diode, pull-up resistors disposed on the output side of said photocouplers, and polarity detection input terminals provided on said transmission control circuit device for receiving outputs of said photocouplers.

13. A terminal unit according to claim 11, wherein said polarity switching circuit is connected at its input side with output terminals of said transmission control device and connected at its output side with said transmission circuit and is constituted of a pair of NOT circuits each thereof receiving the polarity setting output, a pair of first NAND circuits receiving output of said NOT circuit and output from one of the output terminals, a pair of second NAND circuits receiving the polarity setting output and output from the other one of the output terminals, and a pair of NAND circuit each thereof receiving output of each of said first and second NAND circuits.

14. A terminal unit according to claim 11, wherein said polarity setting device is constituted of a D.C. power source for supplying a direct current to said transmission line, a current limiting resistor connected to the positive electrode side of said D.C. power source, a current detector connected at both ends of said resistor in parallel therewith for detecting the quantity of a direct current, and a pair of switches disposed between said resistor and the positive signal line and between the negative electrode of said power source and the negative signal line for cutting off the current.

15. A terminal unit according to claim 11, wherein a switching transistor and a relay are disposed between a coupling transformer provided on the output side of said polarity switching circuit and said transmission line, said transistor having its base side connected with a polarity detection signal output terminal provided on said transmission control device and its emitter side grounded, and said relay being connected with the collector side of said transistor and having its contacts between said transformer and said transmission line.

* * * * *